United States Patent [19]

Anderson

[11] Patent Number: 5,088,439
[45] Date of Patent: Feb. 18, 1992

[54] SAFETY REFLECTOR INCLUDING BRACKET

[76] Inventor: Ronald L. Anderson, 3623 Deal, Houston, Tex. 77025

[21] Appl. No.: 688,844

[22] Filed: Apr. 22, 1991

[51] Int. Cl.$^5$ .................. B60Q 1/30; B61L 15/02
[52] U.S. Cl. .................... 116/30; 116/63 T; 116/28 R
[58] Field of Search ............ 116/28 R, 30, 63 T, 116/175; 40/590; 350/97; 248/218.4, 219, 225.31, 291; 359/515, 533, 448–550, 553

[56] References Cited

U.S. PATENT DOCUMENTS

| 1,535,844 | 4/1925 | McLemore | 116/28 R |
|---|---|---|---|
| 1,635,915 | 7/1927 | White | 116/30 |
| 2,166,520 | 7/1939 | Challoner | 116/30 |
| 3,907,404 | 9/1975 | McEwin | 350/99 |
| 4,045,122 | 8/1977 | Burdick | 350/97 |
| 4,321,883 | 3/1982 | Ruppa | 116/35 A |
| 4,744,537 | 5/1988 | Buckley | 248/219.1 |
| 5,048,451 | 9/1991 | Reimers et al. | 116/35 A |

FOREIGN PATENT DOCUMENTS

| 988493 | 5/1976 | Canada | 248/218.4 |
|---|---|---|---|
| 1456869 | 9/1966 | France | 116/63 P |
| 1548459 | 7/1979 | United Kingdom | 116/63 T |

*Primary Examiner*—William A. Cuchlinski, Jr.
*Assistant Examiner*—W. Morris Worth

[57] ABSTRACT

A safety reflector which is attached to a V-shaped bracket that may be used for mounting onto a boat motor or extended load on a trailer. The safety reflector used to notify persons following such a boat or load that the motor or load is present which will possibly prevent accidental hitting of such. The safety reflector is collapsible and may be easily stored when not in use.

14 Claims, 4 Drawing Sheets

SAFETY REFLECTOR INCLUDING BRACKET

BACKGROUND OF THE INVENTION

The present invention relates to a reflective sign which includes a bracket that may be mounted to objects such as a boat, car, or a load which extends beyond the rear of a vehicle or trailer.

FIELD OF THE INVENTION

Reflective safety signs are known and generally used to notify others of an extended load or to bring attention to a particular object. The recognizable symbol used for safety signs is a bright orange or red triangular shape. Reflective material is often used to reflect lights such as headlights off of the triangular shaped sign which attracts attention and notifies others of an extended load or other object.

Although these reflective safety signs comes in various forms and fashions, they are not as versatile or adaptable as the present invention. More specifically, no prior art found referenced a safety sign designed especially for positioning along the outboard of a boat motor.

SUMMARY OF THE INVENTION

A current copy of the Texas Department of Public Safety handbook states that any load extending more than three feet beyond the front or more than four feet beyond the rear of a vehicle must have a red flag which is visible.

The present invention is a specially designed reflective safety sign including a bracket means which is designed to be adaptable to a plurality of different objects such as cars and extended loads, but more particularly to the outboard motor of a boat. The front and rear surfaces of the safety sign may be of reflective material. The outboard motor of a boat is sometime very difficult to see especially at night. The present invention may easily be affixed to the outboard motor of a boat to alert persons following the transporter of a boat that the boat motor is extending beyond the normal position of the trailer lights.

A safety sign is mounted into a frame which surrounds the safety sign thus holding it in place inside the frame. The base of the frame is hingedly mounted onto a somewhat V-shaped bracket. A locking mechanism is provided which fixes the position of the safety sign in parallel relationship to the V-shaped bracket. The frame is hingedly mounted to allow the present invention to collapse down to a compact size and be allowed easy transport and storage.

One end of the V-shaped bracket; which bracket may be molded of durable, weather resistant material such as plastic, includes a secured end of a resilient and flexible cording which may be stretched to encompass a stationary object such as a boat motor to secure the V-shaped bracket to the object. The free end of the cording is stretched around the stationary object and then secured to the opposite side of the V-shaped bracket by means of an opening or slit which is carved or molded into the V-shaped bracket to receive the cording. The slit is somewhat angled so as to hold the cording in place.

The inside area of the V-shaped bracket is designed to simulate at least two different shapes which will allow the bracket to be more versatile in affixing to different objects. The overall internal shape of the bracket is also V-shaped, but includes two symmetrical notches on either side of the internal area which simulates a square edge. The two notches are located about half way down the inside V-shape. This shape allows the bracket to be placed easily onto a triangular shaped object, square object or round object without slipping.

The base of the entire V-shaped bracket includes a tab or protruding area which includes an opening is bored laterally through the tab (if the bracket is horizontal). This opening is used to secure the hinging means.

The frame further includes interconnecting means which are located at the base of the frame and may easily be received onto the tab of the V-shaped bracket. The interconnecting means will have symmetrically placed openings which will correspond with the openings through the tab. A means of fastening the frame to the bracket will be used which will hold the two together while allowing hinging movement. The base of the bracket may be designed to allow the frame to completely collapse onto the bracket and lay flat.

An object of the present invention is to provide a means for reflecting light.

Another object of the present invention is to provide a means for alerting others of an extended load.

Yet another object of the present invention is to provide a means for providing a versatile and adaptable bracket for use with a plurality of different shapes.

DETAILED DESCRIPTION OF PREFERRED EMBODIMENT

Figure 1:
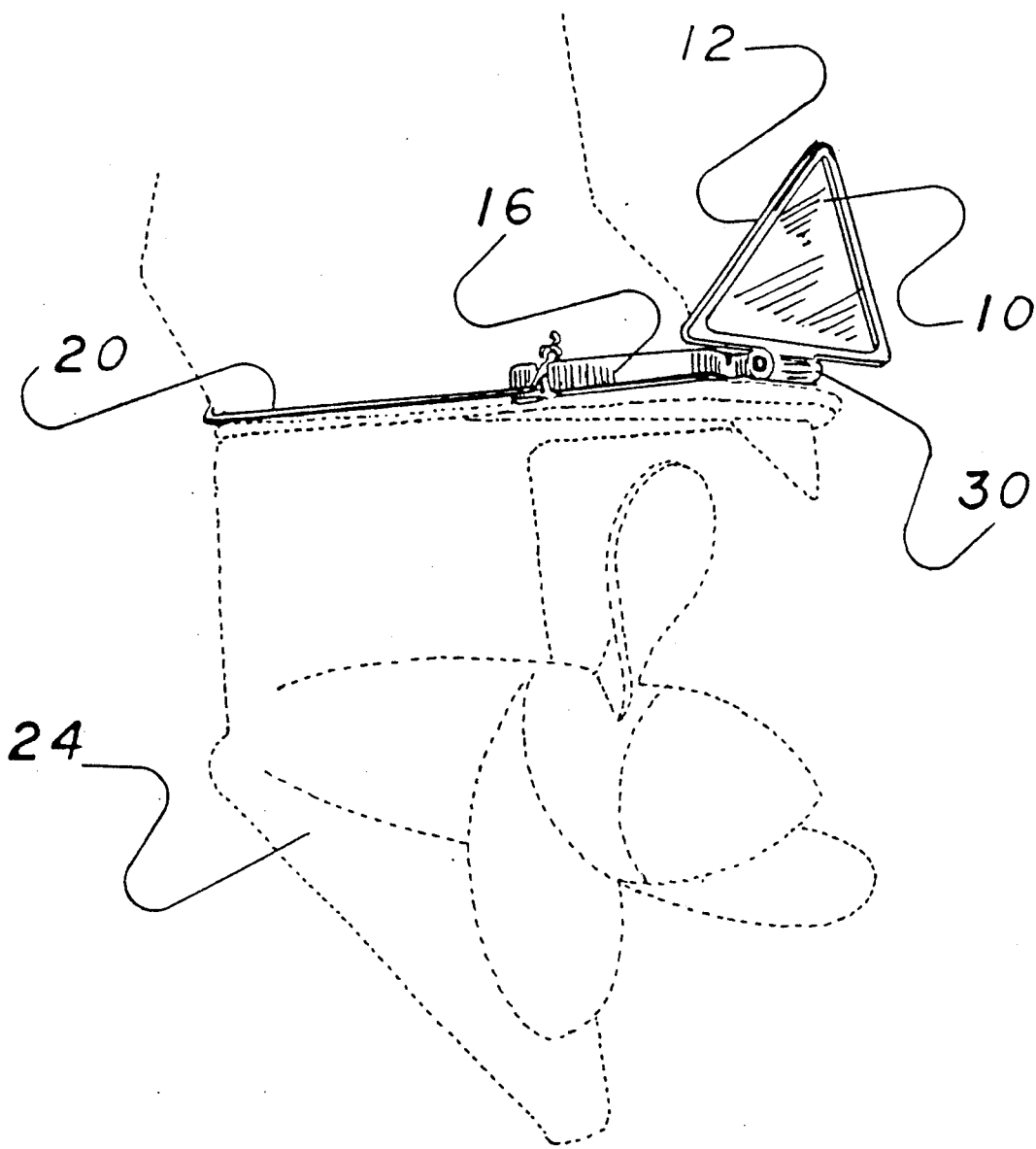
FIG. 1 is a perspective view of the present invention being used in combination with a boat motor.
Figure 2:
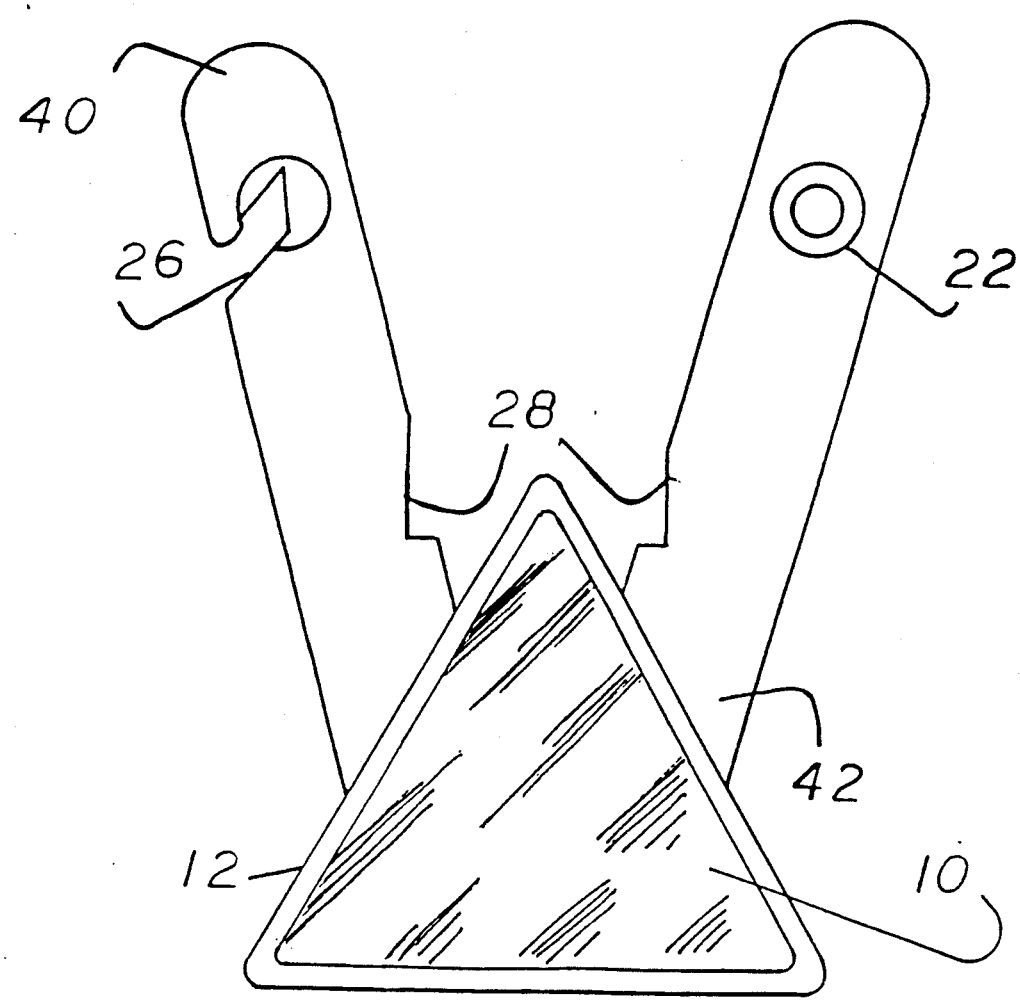
FIG. 2 illustrates the present invention in a collapsed position.

A safety sign 10 preferably made from a dual-sided, reflective, durable, weather resistant material is encased in a similarly shaped frame 12; which frame 12 includes a lip which encompasses the safety sign 10 in order to secure it in place. The base of the frame 12 further includes interconnecting means 14 which may be used to connect the frame 12 to a V-shaped bracket 16. The interconnecting means 14 may comprise a pair of spaced flat surfaces which extend outward from the bottom of the frame 12. The V-shaped bracket 16 includes a distal end 40 which is the top portion of the "V", and a proximal end 42 which has a flat base 44.

One side of the distal end 40 of the V-shaped bracket 16 includes an opening 22 through which one end of a flexible, resilient cording 20 is secured. The opposite side of the distal end 40 of the V-shaped bracket 16 includes a slit or opening 26 which is angled somewhat to receive the free end of the cording 20.

Figure 3:
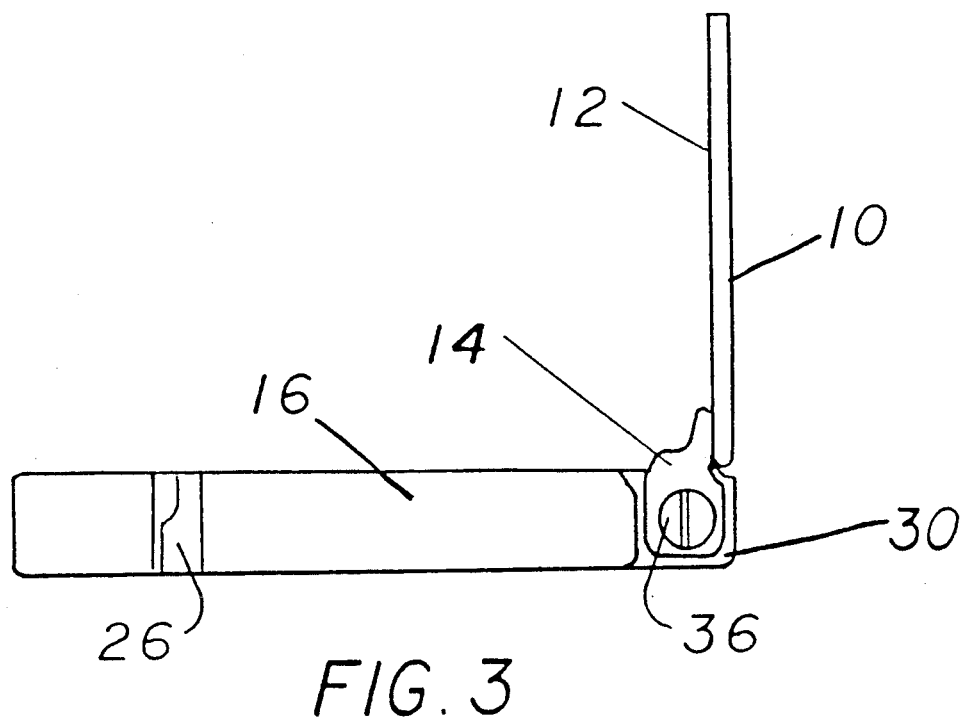
FIG. 3 is a front view of the present invention.
Figure 4:
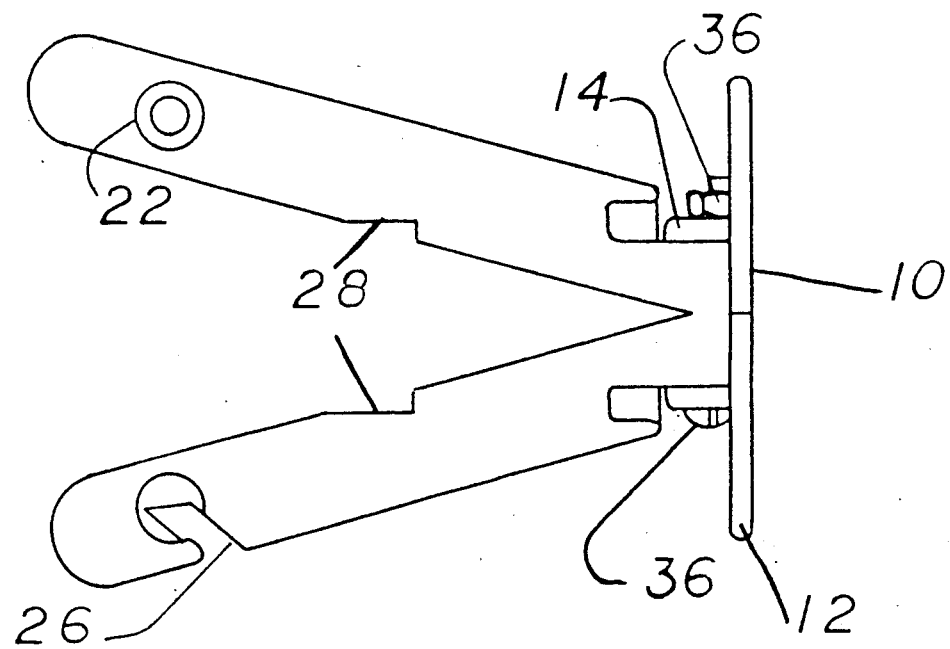
FIG. 4 is a side view of the present invention.
Figure 5:
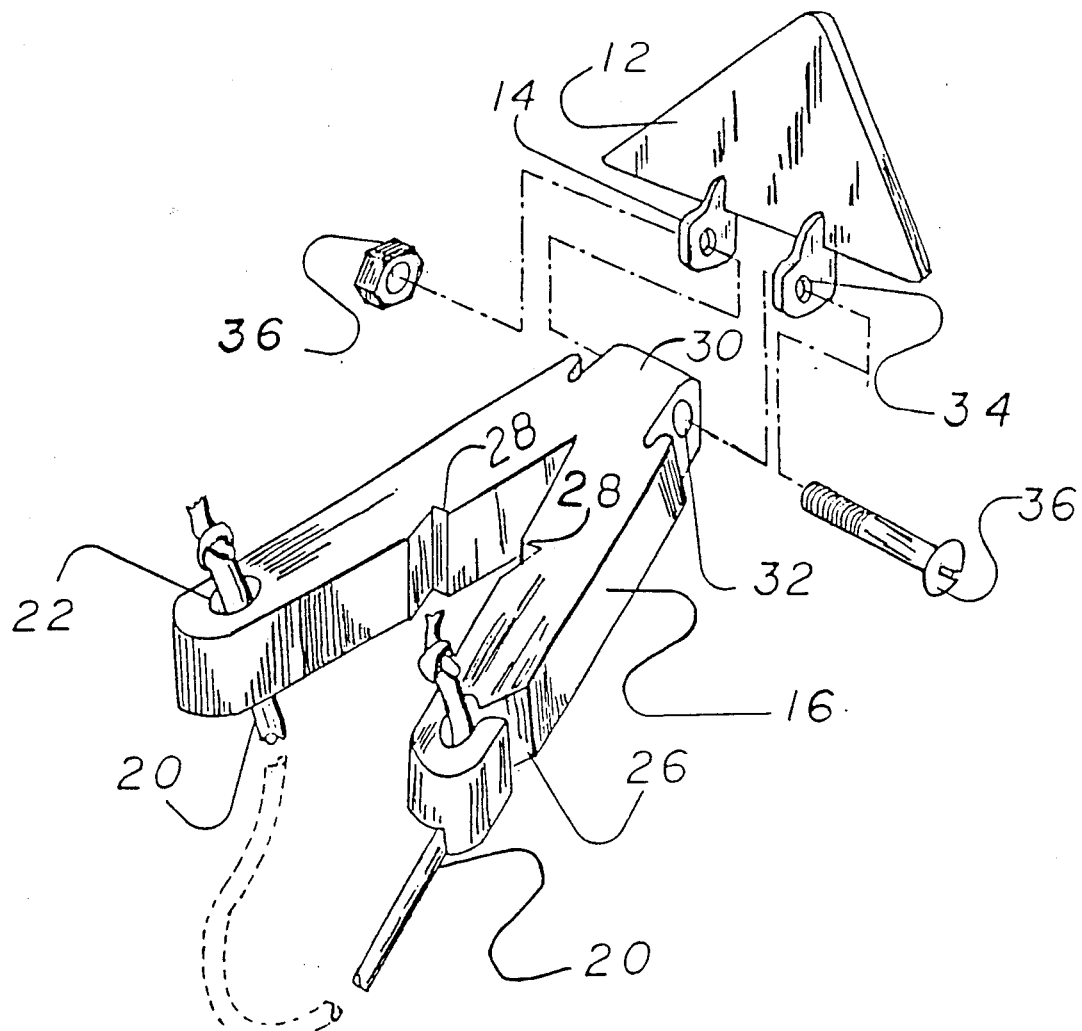
FIG. 5 is an exploded view of the present invention.

The inside area of the V-shaped bracket 16 follows the shape of a "V", but further includes two symmetrically placed notches 28 which are located approximately half way down the internal "V" and cut into the V-shaped bracket. See FIG. 3 for more detail. These notches 28 will allow the present invention to be affixed to a plurality of shaped such as rectangular, square or round. If an object is triangular, the V-shaped bracket will simply be applied beyond the notches 28 and will easily fit the triangular shape.

The proximal end 42 of the V-shaped bracket 16 includes a flat base 44 from which a tab 30 protrudes. A hole 32 is bored through the tab 30 to receive a fastener 36 which will hold the frame 12 to the V-shaped bracket 16. The interconnecting means 14 of the frame 12 are positioned such that they may be easily affixed to the outer portion of the tab 30. The interconnecting means 14 further includes openings 34 which correspond with the hole 32 bored through the tab 30 so that a fastener 36 may be slidably inserted through the interconnecting means 14 and hole 32 bored through the tab 30 and secured thereto. This arrangement will allow for a hinged movement of the frame 12 relative to the V-shaped bracket 16 as well as an ability for the frame 12 and V-shaped bracket 16 to collapse down flat for storage. A locking mechanism may be included which will hold the position of the safety sign 10 in parallel relationship to the V-shaped bracket 16.

The foregoing description of the invention has been directed to a particular preferred embodiment of the present invention for purposes of explanation and illustration. It will be apparent to those skilled in the art that modifications and changes to the safety reflector including bracket may be made without departing from the scope and spirit of the invention. It is, therefore, intended that the following claims cover such modifications and changes.

I claim:

1. An apparatus comprising:
   a safety sign comprising:
     a frame;
     a reflective surface positioned within said frame; and
     interconnecting means attached to a portion of said frame, said interconnecting means for hinged attachment to a V-shaped bracket, said interconnecting means comprising a pair of spaced flat surfaces extending outwardly from said frame, each of said flat surfaces having a hole centrally formed therein, said flat surfaces for hinged connection with a proximal end of said V-shaped bracket;
   said V-shaped bracket having a first side and a second side; and
   a resilient cord detachably connected to at least one of said first and second sides, said resilient cord fastened to a distal end of said V-shaped bracket, said resilient cord extendible from said first side to said second side.

2. The apparatus of claim 1, said frame having a triangular shape, said reflective surface being reflective on a front side and a back side.

3. The apparatus of claim 1, said V-shaped bracket comprising:
   a flat base formed at said proximal end, said flat base having a tab having a hole formed therethrough, said flat surfaces of said interconnecting means aligned with said tab; and
   a fastener extending through the holes of said flat surfaces and through said hole of said tab, said fastener for causing said safety sign to be in hinged relationship to said V-shaped bracket.

4. The apparatus of claim 1, said V-shapd bracket further comprising:
   an opening formed in said first side of said distal end, said opening for receiving an end of said resilient cord.

5. The apparatus of claim 4, said V-shaped bracket further comprising:
   a slit formed in said second side of said distal end, said slit for detachably receiving another end of said resilient cord.

6. The apparatus of claim 1, said V-shaped bracket further comprising:
   a first notch formed in an inner surface of said first side; and
   a second notch formed in an inner surface of said second side, said first notch in symmetrical relationship with said second notch.

7. The apparatus of claim 4, said cord having one end secured in said opening and extending outwardly therefrom.

8. The apparatus of claim 1, said safety sign rotatable about the hinged connection between a first position and a second position, said safety sign being perpendicular to said V-shaped bracket in said first position, said safety sign in overlying relationship to said V-shaped bracket in said second position.

9. A safety reflector comprising:
   a safety sign comprising:
     a frame having a triangular shape;
     a reflective surface positioned within said frame, said reflective surface being reflective on a front side and a back side; and
     interconnecting means attached to a portion of said frame, said interconnecting means for hinged attachment to a V-shaped bracket, said interconnecting means comprising a pair of spaced flat surfaces extending outwardly from said frame, each of said flat surfaces having a hole centrally formed therein, said flat surfaces for hinged connection with a proximal end of said V-shaped bracket;
   said V-shaped bracket having a first side and a second side, said first side having a first notch formed along an inner surface, said second side having a second notch formed along an inner surface, said first and second notches in symmetrical relation to each other; and
   securement means connected to an end of said V-shaped bracket opposite said safety sign, said securement means for attaching said bracket to an object.

10. The safety reflector of claim 9, said V-shaped bracket comprising:
    a flat base formed at said proximal end, said flat base having a tab with a hole formed therethrough, said flat surfaces of said interconnecting means aligned with said tab; and
    a fastener extending through the holes of said flat surfaces and through said hole of said tab, said fastener for causing said safety sign to be in hinged relationship with said V-shaped bracket.

11. The safety reflector of claim 9, said V-shaped bracket further comprising:
    an opening formed in said first side of a distal end, said opening for receiving an end of said securement means; and
    a slit formed in said second side of a distal end, said slit for detachably receiving another end of said securement means.

12. The safety reflector of claim 11, said securement means comprising:
    a resilient cord connected at one end to said opening, said resilient cord detachably connected at another end to said slit, said resilient cord extending around said object.

13. A safety reflector comprising:

a safety sign;

a V-shaped bracket having a proximal end connected to said safety sign, said V-shaped bracket having a distal end opposite said safety sign, said V-shaped bracket having a hole formed in said distal end on one side of said bracket, said V-shaped bracket having a slit formed in another side at said distal end of said bracket, said safety sign in hinged relationship with said V-shaped bracket, said safety sign rotatable about a hinged connection at said proximal end between a first position and a second position, said safety sign being perpendicular to said V-shaped bracket in said first position, said safety sign in overlying relationship with said V-shaped bracket in said second position; and a cord secured at one end to said opening, said slit for receiving another end of said cord.

14. The safety reflector of claim 13, said V-shaped bracket further comprising:

a first notch formed in an inner surface on said one side of said bracket; and a second notch formed in said another side of said bracket, said first notch in symmetrical relationship to said second notch.

* * * * *